Patented Mar. 10, 1942

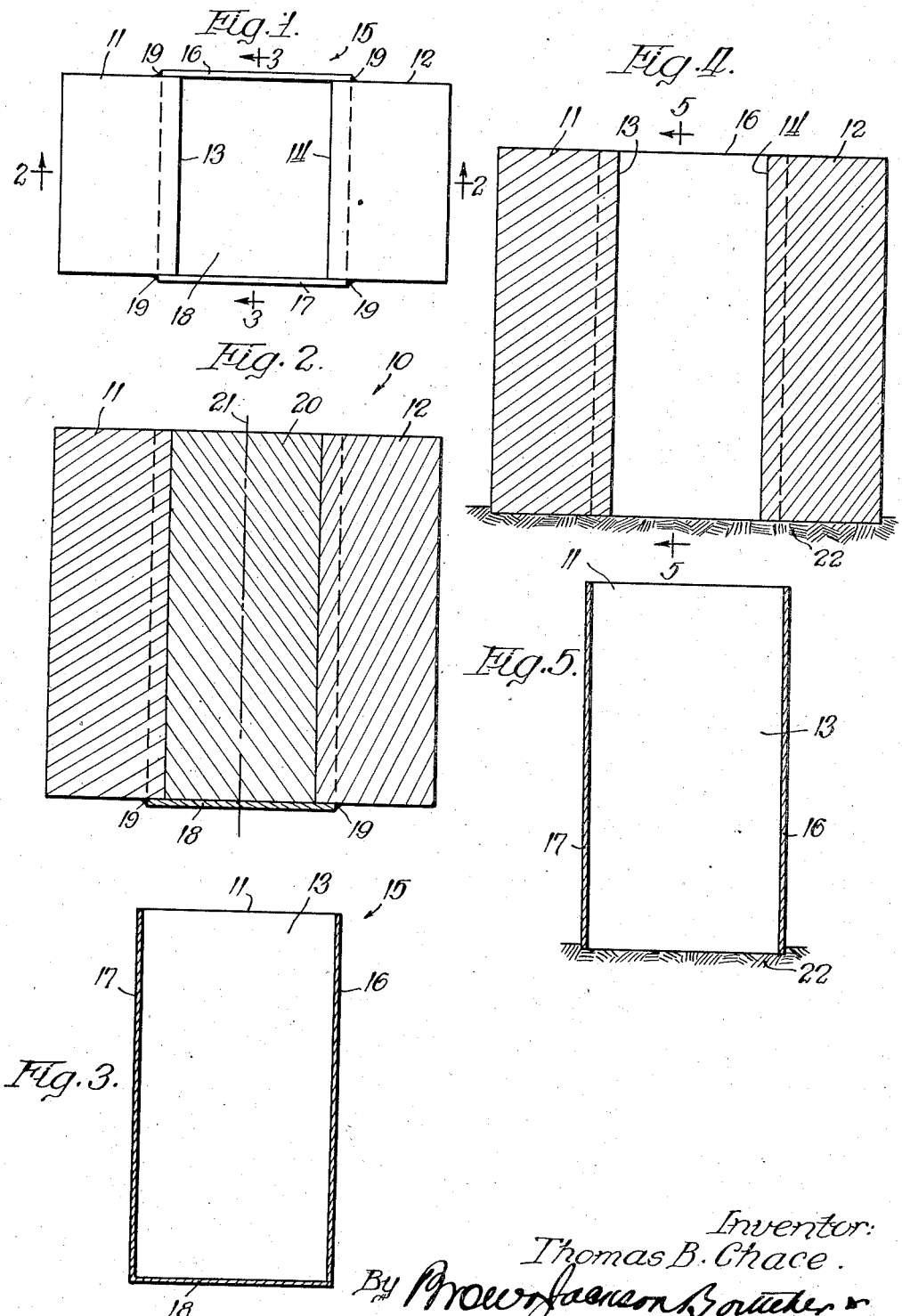

2,275,585

UNITED STATES PATENT OFFICE 2,275,585

METHOD OF MAKING COMPOSITE METAL

Thomas B. Chace, Winnetka, Ill., assignor to Clad Metals Industries, Inc., Chicago, Ill., a corporation of Illinois Application October 8, 1937, Serial No. 167,909

1 Claim. (Cl. 29—189)

This invention relates generally to methods of producing clad metal products and it relates particularly to the manufacture of double composite slabs and means of machining the facing metal surfaces before rolling into strips, sheets, structural shapes, and the like.

It is well known to form a double composite ingot by locating two slabs of non-corrosive facing metal in the center of a mould and then pouring backing metal, such as plain steel, to fill the mould and form a bond with the facing metal. The resulting pile is then rolled to the desired thickness and the edges and ends are sheared to provide two composite slabs or sheets, each having a corrosion resisting facing and a steel backing. This method is not workable when using combinations of metals that have different melting temperatures, particularly when the facing metal or alloy, such as copper or one of its alloys, is the lower melting point metal. This method is also limited as to the size of ingot that can be produced due to the fact that the large mass of backing metal, when poured around the facing inserts, does not radiate heat fast enough to prevent melting of the inserts.

It is common practice in processing many non-ferrous rolled products to overhaul the surfaces between successive rolling operations. That is, a cast billet is rolled to a semi-finished gauge and then overhauled, such as by scalping or milling to remove blisters and other surface imperfections. The resulting product is then re-rolled to finish gauge. This is necessary in order to secure the desired surface finish for many products. Such method of treatment presents somewhat of a problem in the processing of clad sheets having a heavy steel backing and a thin facing of non-corrosive metal, such as any of the non-ferrous metals or the so-called stainless steels, in that the clad slabs made by steel mill practice are much larger and can not be readily overhauled by ordinary brass or coppermill methods. One object of the present invention, therefore, is to provide a simple and cheap means of surface overhauling on clad metal products.

The object of my invention, generally stated, is to provide for simultaneously making two composite metal slabs in a manner in which the facing metal or alloy may be more efficiently employed than heretofore and in which the surfaces of the facing metal are at once suitable for subsequent working.

Another object of my invention is to provide a composite slab as an integral body with a layer of facing metal between two layers of backing metal and then cut through the layer of facing metal to provide two composite slabs in which the surfaces of the facing metal are at once ready for subsequent working as a result of the cutting operation.

Other objects of my invention will, in part, be obvious and in part appear hereinafter.

My invention, accordingly, is disclosed in the embodiments thereof shown in the accompanying drawing, and it comprises features of construction, combination of elements, arrangements of parts, and method steps which will be exemplified in the constructions hereinafter set forth, and the scope of the application of which will be indicated in the appended claim.

For a more complete understanding of the nature and scope of my invention, reference may be had to the following detailed description taken in connection with the accompanying drawing, in which:

Figure 1 is a view in top plan, of the mould construction that is employed in practicing my invention;

Figure 2 is a sectional view taken along the line 2—2 of Figure 1, and showing the cladding metal in the mould space provided therefor;

Figure 3 is a sectional view, taken along the line 3—3 of Figure 1, showing in more detail one form of mould strip;

Figure 4 is a vertical sectional view of another embodiment of mould construction that may be employed in practicing my invention; and Figure 5 is a sectional view taken along the line 5—5 of Figure 4 showing more clearly the provision of two mould strips, the bottom of the mould being closed by the sand of the casting floor.

Generally speaking, my invention resides in the casting of a facing metal or alloy between two backing slabs that are spaced apart a predetermined distance and then severing the layer of facing metal or alloy in some manner to provide two composite slabs the adjacent surfaces of which are ready to be worked without requiring any further processing. According to the invention, the layer of facing metal is cut through, as by a saw, in order to provide the two composite slabs.

As shown in Figure 1 of the drawing, in carrying out my invention I provide two backing slabs 11 and 12 which are preferably formed of mild steel. The slabs 11 and 12 are of suitable size, as will be readily understood, to provide the desired relative thicknesses of the resulting layers in the composite slabs. The inner welding surfaces 13 and 14 of the slabs 11 and 12 are thoroughly cleaned, as by sand blasting or pickling, so that they will be free from oxides. They are then arranged in spaced-apart relation with the surfaces 13 and 14 forming opposite walls of a mould space which is twice the thickness plus the cutting loss of the desired proportional cladding on one sheet. The sides and bottom of the space between the slabs 11 and 12 are closed off by a mould strip, shown generally at 15, to provide a liquid-tight mould capable of retaining molten metal at high temperatures. It will be observed that the mould strip 15 comprises side members 16 and 17 and a bottom member 18, Figure 3. It will be understood that these side and bottom members may be formed by individual strips or that they may be formed by one continuous strip. Preferably they are formed of relatively thin steel strip material and are welded, as indicated at 19, along the adjacent surfaces of the backing slabs 11 and 12. By this construction, a liquid-tight mould is provided that is relatively strong and it may be moved about as desired by a crane. At the same time the backing slabs 11 and 12 are securely held in the desired spaced-apart relation so that this insures that the desired thickness of facing metal will be provided.

The mould assembly, as shown in Figure 1, is then preheated to welding temperature under conditions which exclude atmosphere from the welding surfaces 13 and 14. This may be done either by covering the welding surfaces 13 and 14 with a suitable flux or by preheating in a reducing atmosphere.

When the mould assembly has been properly preheated, the mould space between the welding surfaces 13 and 14 is filled with molten facing metal which forms an integrally diffused bond with these welding surfaces of the backing slabs 11 and 12. The facing metal or alloy may be formed of copper or copper alloys.

After the molten facing metal has been poured into the mould space, the entire assembly is allowed to cool to room temperature. In order to provide the two composite slabs, the layer 20 of facing metal, as shown in Figure 2 of the drawing, may be cut, as by a saw, along the line 21, thereby leaving a portion of the facing metal integrally bonded to each of the backing slabs 11 and 12. It will be obvious that the surfaces of the resulting layers of facing metal formed by the saw cut will be free from imperfections and that, assuming that there are no slag inclusions or the like, no further cleaning or machining operations are necessary in order to provide the desired finished surfaces suitable for subsequent working of the composite slabs into sheets, strips, structural shapes, and the like. I have found that, by machining or cutting through the center of the resulting casting or through the center of the facing metal, better surfaces are provided than by merely machining off a thin skin from slabs cast in a conventional mould.

If the pile, as shown in Figure 2 of the drawing, is of substantial thickness, it may be desirable to refine the cast facing metal structure before the machining or cutting operation is performed. This may be accomplished by hot rolling the entire assembly and subsequently machining or sawing centrally through the pile to provide the two composite slabs.

It will be obvious that the foregoing steps may be departed from to suit the particular combination of materials being processed or the available equipment without departing from my invention. For instance, the mould space may be filled with slag or flux material which has a low specific gravity and a comparative low fusing temperature. This will protect the welding surfaces 13 and 14 during preheating of the mould and is readily displaceable by the facing metal when it is poured. The mould may be filled with solid facing metal, such as cast inserts, or scrapped irregular pieces, making up the proper weight, the top may be covered with a flux or slag, and the assembly then subjected to furnace temperature sufficient to melt the facing metal and raise the backing slabs 11 and 12 to melting temperature. As indicated, the welding surfaces 13 and 14 can also be coated with a protecting flux while the mould is being brought to welding temperature.

As shown in Figures 4 and 5 of the drawing, the bottom member 18 may be omitted and the bottom of the mould space may be closed by the sand floor 22 of the foundry. The mould formed by the backing slabs 11 and 12 and the side members 16 and 17 may be preheated as described hereinbefore with the welding surfaces 13 and 14 suitably protected from oxidization. The mould is then placed upon the sand floor 22 of the foundry to close the bottom and the molten facing metal is then poured into the mould space as described. When the resulting pile has cooled sufficiently, the layer of facing metal may be severed to provide the two composite slabs.

The mould assembly shown in Figure 4 can be preheated to welding temperature in a bath of viscous molten slag. When it has reached the desired temperature, it is removed to the sand floor 22. Sufficient liquid slag clings to the welding surfaces 13 and 14 to exclude atmosphere while the assembly is being moved to the sand floor and until the facing metal has been cast.

I claim as my invention:

Method of producing a pair of metal slabs having a relatively thick steel backing and a relatively thin copper facing fusion bonded to said steel backing suitable for reduction by rolling into thin composite stock which comprises forming a mould by disposing a pair of flat steel backing slabs adjacent each other with their major axes vertical and having welding faces disposed in substantially parallel planes and spaced apart a distance substantially twice the thickness of the facing to be formed on each slab to form a mould space between the slabs, cleaning the welding faces of the slabs, welding sheet stock to the sides of the steel slabs to hold the slabs in fixed spaced relation and to form lateral closures for the mould space between the slabs, preheating the mould including the slabs, pouring molten copper into the mould space of the preheated mould, allowing the copper to solidify, and cutting through the mould and the cast copper in a median plane between and substantially parallel to the welding faces to form two copper faced slabs the exposed copper surfaces of which are raw metal substantially free of impurities and working the slabs by rolling on said cut faces.

THOMAS B. CHACE.